UNITED STATES PATENT OFFICE.

WILLIAM GODSON LINDSAY, OF NEW YORK, N. Y., ASSIGNOR TO THE CELLULOID COMPANY, A CORPORATION OF NEW JERSEY.

NON-INFLAMMABLE CELLULOSE COMPOUND AND METHOD OF MAKING SAME.

1,067,785.  Specification of Letters Patent.  Patented July 15, 1913.

No Drawing. Original application filed May 5, 1909, Serial No. 494,178. Divided and this application filed April 8, 1911. Serial No. 619,686.

*To all whom it may concern:*

Be it known that I, WILLIAM GODSON LINDSAY, a citizen of the United States, residing at New York, in the county of New York and State of New York, have invented certain new and useful Improvements in Non-Inflammable Cellulose Compounds and Methods of Making Same, of which the following is a full, clear, and exact specification.

This invention relates to a new composition of matter which is non-inflammable, and which possesses permanently great strength and tenacity, and can be used as a substitute for nitro-cellulose compositions such as celluloid and similar substances, and also to the process of making the same.

The present application is a division of my application No. 494,178, filed May 5, 1909.

Heretofore, it has been proposed to substitute acetyl cellulose for nitro-cellulose in the manufacture of compounds of which celluloid is a prominent example. But, so far as I am now aware, such compounds have been unsuccessful, principally for the reason that the compounds were not sufficiently strong and not sufficiently tenacious, whether obtained by evaporation from a solution or by manipulating a plastic mass, nor have they been non-inflammable.

I have discovered that triphenylphosphate can be combined with acetyl cellulose to produce a non-inflammable compound having great strength and tenacity, and other valuable properties, and the present invention is designed to point out to the operator a practical method of using or combining these two substances in making films and other forms of such compounds. So far as I know, I am the first to successfully use triphenylphosphate with acetyl cellulose, and also the first to discover the method of making a useful product or compound containing acetyl cellulose and triphenylphosphate.

In carrying out my invention I select an acetyl cellulose which is soluble in acetone, a solution is made of such acetyl cellulose in acetone and to this solution is added triphenylphosphate, either in solid form or previously dissolved in acetone or other similar solvent. The amount of triphenylphosphate may be varied in proportions from ten to twenty parts by weight to each one hundred parts of the acetyl cellulose, and the acetone or other suitable solvent is added in sufficient quantity to make either a flowable solution or a plastic mass, as is well understood by those skilled in the art; but I do not limit myself to any specific proportions because they may be diminished or increased as desired. The addition of triphenylphosphate increases both the strength and tenacity and also insures non-inflammability. This increase in strength and tenacity may, as I have found by experiment, be secured in greater or less degree by substances which are to a large extent equivalents of triphenylphosphate, such as diphenylamin, trichlorphenol, tricresylphosphate, and, to a lesser extent, phenolsalicylate. I prefer, however, the triphenylphosphate because, while it imparts a non-inflammability to the compound, it does not impart any color or odor to the product. Again, as indicated, I may use other menstrua or solvents than acetone, such for instance as chloroform, ethyl acetate or acetylene tetrachlorid, which, either alone or when two of them are mixed together, are capable of dissolving the acetyl cellulose in the presence of triphenylphosphate or other substances indicated above. I have also found that it may be useful in some cases to use alcohols in the solvent mixture both for the purpose of causing fluidity and for regulating the evaporation of the solvent. A further advantage in employing these solvent or menstrua substances in the case of some of the heavy solvents arises from their property of restraining or modifying the volatility of the mixture and thus increasing the tensile strength and elasticity of the resultant product; acetylene tetrachlorid, when used alone, or with chloroform, alcohol, ethylacetate or the like, in varying proportions is especially useful in this connection. By the addition of about $1\frac{1}{2}\%$ of urea, still greater permanency and tenacity will be imparted to my compound. The proportion of urea or equivalent substance will vary according to the desired degree of increased strength and the stability of final product. A proportion of two parts urea to one hundred parts of the cellulose compound gives most excellent results; a less proportion is sufficient for ordinary purposes. I have obtained satisfactory results with a proportion of urea as low as one part to one hundred parts of the cellulose compound.

For certain purposes, it is advantageous to make a thorough mechanical mixture containing the acetyl cellulose and triphenylphosphate, or equivalent substances, and subsequently add the solvent or liquid menstruum.

The product made in accordance with my invention can be made in the form of films or thin sheets. Any approved method of forming films or thin sheets from a flowable solution may be employed. It will be understood, also, that the flowable solution formed as above described may be applied as a protecting surface, such a coating possessing also the property of being waterproof. The final product may also be made in the form of a mass of any desired thickness.

It will be obvious that suitable pigments or coloring matter may be added to the above mixture or solution to produce a final product for use in imitating other substances, such as amber, ivory, horn, marble, or the like. Where I employ the expression "acetyl cellulose soluble in acetone" in the claims, it is to be understood that I mean such variety of acetyl cellulose which is freely soluble in acetone, and that this variety of acetyl cellulose is substantially completely soluble in acetone.

Having thus described my invention, I declare that what I claim as new and desire to secure by Letters Patent, is:

1. A non-inflammable composition of matter containing an acetyl cellulose soluble in acetone, in combination with a non-volatile substance for effecting non-inflammability.

2. A composition of matter containing an acetyl cellulose soluble in acetone, in combination with triphenylphosphate.

3. A composition of matter containing an acetyl cellulose soluble in acetone, a solvent and triphenylphosphate.

4. A composition of matter containing an acetyl cellulose soluble in acetone, triphenylphosphate and a solvent composed of a heavy and a light solvent adapted to regulate the tensile strength and elasticity.

5. A composition of matter containing an acetyl cellulose soluble in acetone 100 parts, urea from 1½ to 2 parts, triphenylphosphate and acetone.

6. The process of making a substitute for nitrocellulose compounds consisting in combining an acetyl cellulose soluble in acetone 100 parts, triphenylphosphate 10 to 20 parts by the use of acetone, and adding from 1½ to 2 parts of urea.

7. The process of making a substitute for nitrocellulose compounds consisting in combining an acetyl cellulose soluble in acetone 100 parts, triphenylphosphate 10 to 20 parts by the use of a solvent, and adding from 1½ to 2 parts of urea.

8. The process of making a non-inflammable composition of matter consisting in combining triphenylphosphate and an acetyl cellulose soluble in acetone by the use of a common solvent.

9. The process of making a non-inflammable composition of matter consisting in combining triphenylphosphate with an acetyl cellulose soluble in acetone and adding acetone.

10. The process of making a non-inflammable composition of matter consisting in combining an acetyl cellulose soluble in acetone and triphenylphosphate by the use of a solvent composed of acetylene tetrachlorid, acetone and alcohol.

11. The process of making a non-inflammable composition of matter which consists in combining triphenylphosphate and an acetyl cellulose soluble in acetone, by the use of a common solvent, and adding urea.

12. A composition of matter containing an acetyl cellulose soluble in acetone and triphenylphosphate in admixture with acetone.

13. A composition of matter containing an acetyl cellulose soluble in acetone, and triphenylphosphate, in admixture with acetylene tetrachlorid, acetone and alcohol.

14. A composition of matter containing an acetyl cellulose soluble in acetone and triphenylphosphate in admixture with a solvent common to both.

15. A composition of matter containing an acetyl cellulose soluble in acetone, and triphenylphosphate, in admixture with acetylene tetrachlorid and acetone.

16. A composition of matter containing an acetyl cellulose soluble in acetone, triphenylphosphate, and urea, in admixture with acetylene tetrachlorid and acetone.

17. The process of making a non-inflammable composition of matter which consists in combining triphenylphosphate and an acetyl cellulose soluble in acetone by the use of a solvent composed of acetylene tetrachlorid and acetone.

In testimony whereof I affix my signature in presence of two witnesses.

WILLIAM GODSON LINDSAY.

Witnesses:
C. V. EDWARDS,
G. N. KERR.